US012779738B2

(12) United States Patent

Mendez et al.

(10) Patent No.: US 12,779,738 B2

(45) Date of Patent: Nov. 3, 2026

(54) PROCESS FOR REMOVING UV CURABLE PRINTING INKS

(71) Applicant: Sun Chemical Corporation, Parsippany, NJ (US)

(72) Inventors: Miriam Mendez, Carlstadt, NJ (US); Rich Bianchi, Carlstadt, NJ (US); John Donaleski, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 154 days.

(21) Appl. No.: 18/727,610

(22) PCT Filed: Feb. 3, 2023

(86) PCT No.: PCT/US2023/012254

§ 371 (c)(1),
(2) Date: Jul. 9, 2024

(87) PCT Pub. No.: WO2023/150251

PCT Pub. Date: Aug. 10, 2023

(65) Prior Publication Data

US 2025/0073960 A1 Mar. 6, 2025

Related U.S. Application Data

(60) Provisional application No. 63/306,539, filed on Feb. 4, 2022.

(51) Int. Cl.
*B29B 17/02* (2006.01)
*B29B 17/04* (2006.01)

(52) U.S. Cl.
CPC .......... *B29B 17/02* (2013.01); *B29B 17/0412* (2013.01); *B29B 2017/0289* (2013.01)

(58) Field of Classification Search
CPC ................ B29B 17/02; B29B 17/0412; B29B 2017/0289; B29B 2017/0484; B29K 2105/0032; B29L 2031/712; Y02W 30/62
See application file for complete search history.

(56) References Cited

U.S. PATENT DOCUMENTS

| | | | | |
|---|---|---|---|---|
| 6,147,041 A | | 11/2000 | Takahashi | |
| 2004/0130059 A1* | | 7/2004 | Kern | C08J 5/18 264/235.8 |
| 2017/0009108 A1* | | 1/2017 | Mitchell | C09J 7/29 |
| 2020/0263020 A1* | | 8/2020 | De Rossi | C08L 33/08 |
| 2021/0380777 A1* | | 12/2021 | Côté | B29B 17/02 |
| 2021/0385425 A1 | | 12/2021 | Sun | |
| 2023/0227622 A1* | | 7/2023 | DeBruin | C08J 11/24 521/48.5 |

FOREIGN PATENT DOCUMENTS

| | | | | |
|---|---|---|---|---|
| EP | 0588533 | A2 | 3/1994 | |
| EP | 0588534 | A2 * | 3/1994 | B41M 7/0081 |
| EP | 0924678 | A2 | 6/1999 | |
| EP | 2987822 | B1 | 8/2017 | |
| JP | 2001131484 | A | 5/2001 | |
| WO | WO2017/040654 | A1 | 3/2017 | |
| WO | WO2021/081288 | A1 | 4/2021 | |
| WO | WO2021/165081 | A1 | 8/2021 | |

OTHER PUBLICATIONS

International Search Report issued in International Application No. PCT/US2023/012254, mailed May 19, 2023.
Written Opinion of the International Searching Authority issued in International Application No. PCT/US2023/012254, mailed May 19, 2023.
International Preliminary Report on Patentability (Chapter II of the Patent Cooperation Treaty) issued in International Application No. PCT/US2023/012254, mailed Jun. 5, 2024.

* cited by examiner

*Primary Examiner* — Alexander Markoff
(74) *Attorney, Agent, or Firm* — Marian E. Fundytus; Amster Rothstein & Ebenstein LLP

(57) ABSTRACT

A method of recycling plastic articles, such as bottles and labels affixed to bottles, that are printed with UV curable inks, wherein the inks and colorants from the inks are removed as solid particles upon treatment with a hot alkaline solution to provide colorless or nearly colorless plastic materials for recycling that are not contaminated by the inks or colorants.

11 Claims, No Drawings

PROCESS FOR REMOVING UV CURABLE PRINTING INKS

CROSS REFERENCE TO RELATED APPLICATIONS

The present application is a § 371 National Phase application based on PCT/US2023/012254 filed Feb. 3, 2023, which claims the benefit of U.S. Provisional Application No. 63/306,539, filed Feb. 4, 2022 the subject matter of each of which is incorporated by reference in their entirety.

FIELD OF THE INVENTION

The present invention relates to processes for recycling articles, e.g. bottles that are printed with energy curable inks. The present invention provides a method of recycling plastic articles, such as containers or labels, printed with UV curable ink compositions comprising colorants, wherein the inks and colorants are removed from the plastic articles, and in particular embodiment, labels, without the recycled plastic materials being contaminated with colorants or other components of the ink.

BACKGROUND OF THE INVENTION

The recycling of non-biodegradable plastics that are found in everyday articles like containers, packaging, and a vast number of molded articles, continues to grow in importance. Single use products, including, for example, plastic bottles, cups, bags, food wrapping, etc., make up a large part of the plastics introduced into the environment. Synthetic polymers such as polyethylene (PE), polypropylene (PP), polyethylene terephthalate (PET), and others, are extremely useful in flexible packaging, which has led to a huge growth in the use of disposable plastic materials.

Due to its ability to be readily recycled, polyethylene terephthalate (PET) has largely replaced other polymers in the production of plastic food and beverage containers, e.g., PET bottles. Bottles, containers, wrappers and other packaging are typically labeled by either printing on the article itself, or by affixing a printed label onto the article. Full body shrink-sleeve labels, produced using polymer films, e.g., films of PETG (polyethylene terephthalate glycol), are widely used on food and beverage containers, such as PET bottles. However, when recycling post-consumer PET bottles, for example, the bottles and labels attached thereto enter the recycling process together and are very difficult to separate downstream. A new class of polymer, crystallizable PET resin, is currently available and has been shown to be fully recyclable together with the PET flake from the bottles, but other issues in recycling remain.

For example, the inks used in labeling the plastic articles or labels need to be removed during recycling. This is typically done by using a hot caustic wash as part of the recycling process. Unfortunately, if the inks from either the article or the label dissolve in the hot caustic bath, the ink contaminated wash solution can cause staining of the polymer, e.g., polyester flake, being generated for re-use. Tinting of the flake downgrades its quality and lowers the value of the recycled PET flake, and can lead to increased wastewater treatment cost and potential environmental issues with municipal water sources.

Removing ink from UV/LED-printed items, such as sleeve labels, is a particular challenge for recycling. Typically, UV inks form a solid, chemically and mechanically resistant film layer that is not easily removed, and any residual ink left on the substrate reduces the value of the recycled material.

U.S. Pat. No. 6,147,041 discloses the removal of certain inks from printed articles, such as plastic bottles and shrink labels, by exposure to an aqueous solution of up to 3% NaOH in hot water, typically at about 80° C. to 90° C., wherein the ink compositions comprise (A) a urethane resin and/or an acrylic resin and (B) one or more substances selected from the group consisting of styrene-acrylic acid copolymers, styrene-maleic acid resins, rosin-maleic acid resins and phenol resins as main components of the ink vehicle. The inks of U.S. Pat. No. 6,147,041 contain an organic solvent "as an essential component". Solvent-based inks are widely used when plastic articles are intended for recycling, reflecting the current state of the art in ink technology that holds that water-based inks are not resistant to NaOH solutions and will solubilize in the hot caustic wash used in recycling processes. U.S. Pat. No. 6,147,041 is silent regarding the use of PETG or crystallizable PET in labels.

EP 2987822 discloses a method for removing print from printed PETG substrates by treating a printed PETG composition with a treatment containing an aqueous azeotrope of an organic polar solvent having low molecular weight, selected from the group consisting of ketones, aldehydes, alcohols and esters. The treating composition can be applied to the substrate by rubbing, agitating, mixing or dipping the chopped substrate in the treating composition. However, EP 2987822 fails to disclose crystallizable PET resin for use on labels. Further, the likelihood of repeated treatments with the aqueous azeotrope makes the method of EP 2987822 cumbersome, and the use of solvents in the 'treatment' raises environmental issues.

WO 2021/081288 discloses ink compositions that will not contaminate and stain plastic materials when removed by a hot caustic wash solution during recycling, because, instead of dissolving in the hot caustic wash solution, the inks form a solid or precipitate. The solid or precipitate can then be easily separated from the recycled plastic and wash solution, such as by filtration. The ink compositions of WO 2021/081288 comprise: (a) a resin selected from the group consisting of: polyvinyl chloride-polyvinyl acetate copolymer, semi-aliphatic polyurethane, polymethyl methacrylate copolymer, isobutyl methacrylate copolymer, cellulose-based resins, styrene maleic anhydride copolymer, and combinations thereof; (b) an organic solvent; and (c) a colorant resistant to dissolving in a hot caustic solution.

The methods used in the art above do not address the problem that when UV curable inks are printed on plastic articles or labels present during the recycling process, said UV curable inks will typically either not separate from the plastic or will contaminate or stain the recycled plastic beyond acceptable limits.

JP 2001-131484 discloses the presence of a releasing layer on the surface of a substrate, on which releasing layer inks are printed. The releasing layer comprises a polymer or a copolymer containing 10-60 wt % of a carboxylic group, which becomes water-swellable or water-soluble by at least a neutralization treatment. The carboxylic groups are converted into the respective carboxylate groups during neutralization, which renders the releasing layer water soluble. The releasing layer and the ink applied to it, are then removed from the surface of the substrate.

WO 2021/165081 points out that the method of JP 2001-131484 not only requires the presence of an additional layer between the article and the printed ink, but the release layer is not sufficiently water-resistant under normal conditions of use, and does not dissolve quickly enough, e.g., in less than 15 minutes, or to a sufficient extent so that the substrate from which the layer is released is sufficiently pure. Further, the release layers are said to suffer from poor over-printability.

WO 2021/165081 discloses an alternative to the method of JP 2001-131484, which makes use of a deinking primer composition comprising a binder component having a polymeric backbone with pendent hydroxy or carboxy groups, which hydroxy or carboxy groups have been esterified, acetalised or ketalised to the extent that the binder component has an acid value of 0-50 mg KOH/g or a hydroxyl value of 0-600 mg KOH/g. The ester, acetal or ketal groups are readily hydrolyzed in an alkaline aqueous medium having a pH value from more than 7 to 14, typically at an elevated temperature between 50 to 90° C., preferably 60 to 85° C., within a period of time in the range between 0 to 15 minutes, so that the primer layer prepared from said deinking primer composition is dissolvable in an alkaline aqueous medium.

The use of ester, acetal and ketal protecting groups in WO 2021/165081 addresses at least some of the possible issues in the method of JP 2001-131484. The method of WO 2021/165081 is also said to be particularly useful in removing UV curable ink from printed plastic articles. However, additional separate steps, and a separate primer layer is still required.

There is still a need for a solution to the problem of removing UV cured inks from recyclable plastic materials without the use of a primer, wherein the UV curable inks separate from the plastic and do not contaminate or stain the recycled plastic.

Citation or identification of any document in this application is not an admission that such represents prior art to the present invention.

BRIEF SUMMARY OF THE INVENTION

The present invention broadly provides a method for recycling plastic material from an article comprising said plastic material and a UV cured ink applied either directly to the article or directly to a label attached to the article, wherein the resulting plastic material is not stained or contaminated by the UV cured ink, or colorant from the ink, during recycling.

According to a general embodiment of the invention, the method comprises:

a. providing a plastic article comprising:
   - a surface upon which a UV cured ink has been directly printed without the use of an intervening layer, or
   - a label attached to the article, upon which label a UV cured ink has been directly printed without the use of an intervening layer;
   - wherein the UV cured ink comprises one or more colorants that are resistant to dissolving in caustic solution, and wherein the one or more colorants and the UV cured ink are removable in the form of solid particles that are not dissolvable in a hot caustic wash;

b. immersing the plastic article or plastic article plus label in a hot caustic wash to remove the inks as a particulate precipitate that is essentially insoluble in the caustic wash to provide a non-colored plastic article or plastic article plus label;

c. separating the non-colored plastic article or plastic article plus label from the ink precipitate and the hot caustic wash;
   - wherein the hot caustic wash is an aqueous solution of from 1 wt % to 3 wt % NaOH and/or non-ionic surfactant, at from 70° C. to 95° C., e.g., from 80° C. to 90° C.; and
   - wherein the resultant non-colored plastic article exhibits the following CIELab ΔL, Δa, and Δb values vs. a non-printed (control) plastic article:

$$\Delta L: \leq 7.5$$

$$\Delta a: \leq 2.0$$

$$\Delta b: \leq 2.0.$$

In many embodiments the resultant non-colored plastic article exhibits the following ΔL, Δa, and Δb values vs. a non-printed (control) resultant plastic article:

$$\Delta L: \leq 5.0$$

$$\Delta a: \leq 1.5$$

$$\Delta b: \leq 1.5.$$

In the present invention, the UV cured ink is obtained by applying a UV curable ink directly to the surface of the article or label and curing the applied ink by exposure to UV or UV-LED radiation, without first applying an intervening layer. That is, there is no primer or release layer added to the surface of the article or label prior to printing, which distinguishes the present invention from WO 2021/165081 and JP 2001-131484.

The UV curable ink that is applied to the article or label and cured by exposure to UV or UV-LED radiation is typically a flexographic ink. In many embodiments the plastic article is a container or bottle to which a label printed with UV cured ink is attached.

In many embodiments the plastic article comprises PET, and in many embodiments the label comprises PETG or crystallizable PET (CPET). In some embodiments, the plastic article or label comprises other polymers such as PE, PP, HDPE, PET, styrene, etc. Synthetic paper can also used.

The method further allows for the plastic article or article plus label to be ground into flakes before removing the ink in step b), or after separating the non-colored plastic article or plastic article plus label from the ink precipitate and hot caustic wash in step c).

Additional embodiments provide non-colored plastic articles and labels prepared according to the method.

DETAILED DESCRIPTION OF THE INVENTION

The present invention provides a general method by which plastics that have been printed on with UV curable inks can be decolored and readily recycled. In the method, the UV cured inks and the colorants they contain are removed as solid particles without any contamination of the plastic being recycled and provide colorless recycled polymer.

The method does not use a primer or release layer, and the inks are applied directly onto the surface of a plastic article, typically onto a label attached to a plastic article, thus streamlining and significantly improving the efficiency of the process for removing UV cured ink from plastics being recycled.

The present method provides a solution to the problem of effectively and efficiently removing UV cured inks from plastics, and can be readily used in the commercial industry for successful plastic recyclability of materials, such as plastic labels, printed with UV curable printing inks.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of ordinary skill in the art to which the invention belongs. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "Δbout" is intended to also include the exact amount. Hence "about 5 percent" means "about 5 percent" and also "5 percent." "Δbout" means within typical experimental error for the application or purpose intended.

"Essentially" in the present disclosure, e.g., as in "precipitate that is essentially insoluble", means that any difference between an absolute state, i.e., completely insoluble, and a tolerable less than absolute state, i.e., essentially insoluble, is too small to have a noticeable effect on properties relative to the invention. For example, a colorant that is not absolutely insoluble in a solvent, would be essentially insoluble if, for example, less than 5 wt %, less than 2 wt %, or less than 1 wt % is dissolved in the solvent.

APR stands for Association of Plastics Recyclers.

It is to be understood that wherein a numerical range is recited, it includes all values within that range, and all narrower ranges within that range, whether specifically recited or not.

As used herein, the terms "(meth)acrylate," "(meth) acrylic acid," or "acrylate" include both acrylate and methacrylate compounds, and both acrylic acid and methacrylic acid, unless specified otherwise.

As used herein, the term "binder" means a polymeric or resinous component that helps bind ink components to each other and to the printed substrate. The binder can be one polymeric or resinous component, or a combination of more than one polymeric or resinous component. The binder may serve to adhere the pigment to the substrate, or to keep a pigment uniformly dispersed in a fluid ink vehicle. When referring to the amount of binder in a composition, it refers to the weight of the material used, including the actual binder resin and any diluents or other additives present in the form in which it is used (e.g., binder in ethanol), when the recited weight is based on the total weight of the composition. When the amount of binder is recited on a solid weight basis, this refers to the amount of the actual resin (solids), after the other components (e.g., ethanol) are removed. For example, a composition may comprise 30 wt % of binder material which is a 25% solids solution in ethanol, based on the total weight of the composition. The actual binder resin (solids) that is present based on a solid weight basis is 30(0.25)=7.5 wt %.

As used herein, the term "polymer" includes both homo- and co-polymers.

As used herein, the terms "coating(s)," "coating composition(s)," "ink(s)", "ink compositions(s)," "compositions" and the like are used interchangeably. As used herein, coatings and related terms include inks, and vice-versa.

As used herein, the term "article" or "articles" means a substrate or product of manufacture. Examples of articles include, but are not limited to: substrates such as containers (e.g., bottles, cans), a polyolefin (e.g., polyethylene or polypropylene), a polyester (e.g., polyethylene terephthalate), metalized polyester, and the like.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

An LED (light-emitting diode) is a type of light source which is a semiconductor. Acting as a semiconductor when an electric current flows through it, energy is released in the form of photons, emitting light. The wavelengths generated are in the high end/low energy range of the UV light spectrum. For printing press applications, the LED is typically targeted entirely in one wavelength, for example 385, 395, 405 or 415 nm. The process is an efficient, effective, and productive form of mass press printing, as the LED Curable Flexo Printing Inks are specifically formulated to be receptive and active at the selected wavelength. Good results were obtained in the present invention using an LED light source, in particular at a wavelength of 295 nm, however, depending on the application, other wavelengths may be preferred.

Throughout this disclosure, all parts and percentages are by weight (wt % or mass % based on total weight of a composition), and all temperatures are in ° C. unless otherwise indicated.

The terms “hot caustic bath”, “hot caustic wash” and “hot caustic solution” are defined as an aqueous solution containing 1.0% to 3.0% by weight NaOH at a temperature of 70° C. to 95° C., e.g., 80° C. to 95° C., or 80° C. to 90° C. The terms are used interchangeably herein. Further, the hot caustic bath, wash or solution may contain a surfactant, such as non-ionic surfactant, in an amount of 0.1 wt % to 1.0 wt %. In the testing of the described ink compositions reported in this paper, the “hot caustic bath” or “hot caustic solution” is an aqueous solution comprising 2.0% by weight NaOH at a temperature of 85° C.

Compositions and Methods

The present method relates to the process of removing (i.e., deinking) UV curable inks, e.g., flexographic inks, from plastic articles, such as bottles and labels, that are to be recycled. As mentioned above, UV curable inks typically form solid, chemically and mechanically resistant film layers that are not easily removed. Since any residual ink left on the plastic substrate reduces the value of the recycled material, a need exists for an effective way to remove UV curable inks from recyclable plastics.

During recycling, plastic articles, such as bottles or containers comprising labels printed with inks, are subjected to hot caustic wash solutions that cause the ink to separate from the article, particularly the label. In the present invention, when the UV curable inks are removed from a label on a container, they form a solid or precipitate, as opposed to dissolving in the hot caustic wash solution. The solid or precipitate is easily separated from the recycled plastic and wash solutions, such as by filtration. The separated ink either does not contaminate or stain the recycled plastic or does so to a minimal degree that is acceptable.

The advantage of the present invention is significant in that there is no need or requirement to use a primer with the UV curable printing inks in order to successfully remove them in the recycling of a plastic substrate. Eliminating the need for a primer provides the potential for a faster turn-around of printed articles, while also improving the environmental sustainability by enabling improved and easier recyclability to provide increased sustainability and decreased release of plastic material into the waste stream.

The printed articles of the invention can comprise a wide range of polymers, generally thermoplastic polymers, e.g., polyolefins, such as polyethylene (PE) and polypropylene (PP), polyesters including polyethylene terephthalate (PET) and polyethylene terephthalate glycol (PETG), crystallizable PET (CPET), styrene and styrene copolymers, polyamides such as nylons, and many others. There is a significant interest in PET and PETG articles as a result of the wide use of PET bottles and PETG labels, but any recyclable plastic may be found in articles used in the invention.

The hot caustic solution used herein is similar to those encountered in the references cited in the background section of the disclosure. For example an aqueous solution containing about 1.0% to about 3.0% by weight NaOH at a temperature of about 70° C. to about 95° C., e.g., 80° C. to 95° C., or 80° C. to 90° C. and may also contain a surfactant, such as non-ionic surfactant, in an amount of 0.1 wt % to 1.0 wt %.

A variety of energy curable inks that can be used in the invention are available, e.g., Sun Chemical commercially available energy curable flexographic inks. The inks in the invention often use ‘reactive diluents’ instead of a solvent that would need to be evaporated or otherwise removed. For example, monomers that react to become part of the cured ink binder replace a traditional, non-reactant solvent. The solids content of the inks can be very high. Many embodiments of the invention use inks with 100% solids content, that is, wherein none of the material of the ink evaporates or is otherwise removed during cure. Solvent based flexographic inks containing up to, e.g., 75 wt % solvent, are known, and may be used in the invention, but the use of solvents can create environmental issues. In most embodiments, the ink contains less than 50 wt % water or an organic solvent, generally 30 wt % or less, e.g., 20 wt % or less, and most often 10 wt % or less, e.g., 5 wt % or less.

Preferably the inks will have good adhesion to plastic bottles and substrates, specifically flexible plastic packaging and labeling substrates, and are removable as a solid or precipitate when subjected to hot wash solutions.

The inks of the invention comprise radically polymerizable monomers or oligomers, or radically reactive polymers, colorants, such as pigments that are not soluble in caustic hot water solutions, photoinitiators, and other common materials known in the art including non-reacting resins, solvents, and additives. Examples of the types of raw materials that would be suitable for the inventive process are given below.

Examples of suitable monofunctional ethylenically unsaturated monomers include but are not limited to the following (and combinations thereof), where the terms ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Equivalent methacrylate compounds are also capable of being used, although those skilled in the art will appreciate that methacrylate compounds have lower reactivity than their equivalent acrylate counterparts:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate;

N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate Examples of suitable multifunctional ethylenically unsaturated monomers include but are not limited to the following (and combinations thereof), where the terms ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Equivalent methacrylate compounds are also capable of being used, although those skilled in the art will appreciate that methacrylate compounds have lower reactivity than their equivalent acrylate counterparts:

1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate.

Other functional monomer classes capable of being used in part in these formulations include cyclic lactam such as N-vinyl caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

Oligomers are substances that provide the vehicle for the UV ink. They are similar to monomers, except that they have already been partially polymerized, which makes them more viscous. During curing, the monomers react with the oligomers to create chains in three dimensions. In the printing industry, mainly resins/oligomers with acrylate functionality are used to provide the necessary reactivity to enable adequate cure for modern, high-speed presses.

The main classes of acrylated oligomers includes epoxy acrylates; urethane acrylates; polyester acrylates; acrylic acrylates; hyperbranched polyester acrylates; waterborne UV polyurethane dispersions and, organic-inorganic hybrid materials.

Excellent results have been achieved when using inks based on polyester acrylate and tri-acrylate monomers.

The radiation curable composition of the present invention may contain inert, non-curable resins having no curable acrylic groups with a number average molecular weight of 1000-30000 Daltons, preferred 1000-4000 Daltons. These include resins such as poly(acrylates), poly(ester), poly (urethanes), poly(amides) ketone resins, aldehyde resins, alkyd resins, phenol-formaldehyde resins, rosin resins, hydrocarbon resins, alkyd resins or mixtures of the aforementioned. Such resins improve pigment wetting, gloss, rheology and flexibility.

The radiation curable composition of the present invention may contain, if cured by UV-light, photoinitiators. Suitable photoinitiators include, but are not limited to, the following:

α-hydroxyketones such as; 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl) phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

acylphosphine oxides such as; 2,4,6-trimethylbenzoyl-diphenylphosphine oxide; ethyl (2,4,6-trimethylbenzoyl)phenyl phosphinate; and bis-(2,4,6-trimethylbenzoyl)-phenylphosphine oxide;

α-aminoketones such as; 2-methyl-1-[4-methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one;

thioxanthones such as; 2-4-diethylthioxanthone, isopropylthioxanthone, 2-chlorothioxanthone, and 1-chloro-4-propoxythioxanthone;

benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoylphenylsulpho]phenyl]-2-methyl-2-(4-methylphenylsulphonyl)propan-1-one;

phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]-ethyl ester;

oxime esters such as; 1-phenyl-1,2-propanedione-2-(O-ethoxycarbonyl)oxime; [1-(4-phenylsulfanylbenzoyl) heptylideneamino]benzoate, or [1-[9-ethyl-6-(2-methylbenzoyl)carbazol-3-yl]-ethylideneamino]acetate;

Examples of other suitable photoinitiators include diethoxy acetophenone; benzil; benzil dimethyl ketal; titanocen radical initiators such as titanium-bis(η5-2,4-cyclopentadien-1-yl)-bis-[2,6-difluoro-3-(1H-pyrrol-1-yl)phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN, OMNIPOL ASA from IGM or SPEEDCURE 7040 from Lambson), polymeric benzophenone derivatives (GENOPOL BP-1 or BP-2 from RAHN, OMNIPOL BP, OMNIPOL BP2702 or OMNIPOL 682 from IGM or SPEEDCURE 7005 from Lambson), polymeric thioxanthone derivatives (GENOPOL TX-1 or TX-2 from RAHN, OMNIPOL TX from IGM or Speedcure 7010 from Lambson), polymeric aminoalkylphenones such as Omnipol 910 from IGM; polymeric benzoyl formate esters such as OMNIPOL 2712 from IGM; and the polymeric sensitizer OMNIPOL SZ from IGM.

An amine synergist may also be included in the formulation. Suitable examples include, but are not limited to, the following:

Aromatic amines such as; 2-(dimethylamino)ethylbenzoate; N-phenyl glycine; benzoic acid, 4-(dimethylamino)-, 1,1'-[(methylimino)di-2,1-ethanediyl]ester; and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable;

Aliphatic amines such as N-methyldiethanolamine, triethanolamine and tri-isopropanolamine;

Aminoacrylates and amine modified polyether acrylates EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NEORAD P-81 and NEORAD P-85 ex DSM-AGI.

Suitable colorants include but are not limited to: organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The radiation curable compositions and inks of this invention may contain the usual additives to modify flow, surface tension, gloss and abrasion resistance of the cured coating or printed ink. These additives may function as leveling agents, in-can stabilizers, wetting agents, slip agents, flow agents, dispersants and de-aerators. Preferred additives include fluorocarbon surfactants, silicones and organic polymer surfactants and inorganic materials such as talc. As examples, the TEGORAD product lines (TEGORAD is a trademark of commercially available products from Tego Chemie, Essen, Germany) and the SOLSPERSE product lines (SOLSPERSE is a trademark of commercially available products of Lubrizol Company). Other additives may be incorporated to enhance various properties, such as adhesion promoters, silicones, light stabilizers, optical brighteners, de-gassing additives, ammonia, defoamers, antioxidants, stabilizers, surfactants, dispersants, plasticizers, rheological additives, waxes, silicones, etc.

The radiation curable compositions and inks of this invention may contain the usual extenders such as clay, talc, calcium carbonate, magnesium carbonate or silica to adjust water uptake, misting and color strength.

The radiation curable compositions of the present invention can be UV-cured by an actinic light source, such as, for example, UV-light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3000 mJ/cm$^2$, and more preferably within a range of about 50 to 500 mJ/cm$^2$. In addition, the bulb can be appropriately selected according to the absorption spectrum of the radiation curable composition. Moreover, the inks of this invention can be cured under inert conditions.

The preferred print method for the present application is flexographic, however it is understood that the inks/coatings could be formulated for printing by gravure, screen, spray coating, ink jet, lithographic, roll coating, curtain coating, etc.

The invention is further described by the following non-limiting examples which further illustrate the invention, and are not intended, nor should they be interpreted to, limit the scope of the invention.

EXAMPLES

In the present examples, a series of printed films were prepared and tested to assess various properties considered important for shrink sleeve labels, and tested for color removal according to Association of Plastics Recyclers (APR) standards. The printed films were produced by flexographic printing of test inks onto substrates using a Mark Andy P7 UV Flexo Printing Press. The press uses Mercury UV Lamps and runs at variable rates, a typical dose at 100 meters/minute was 125 mJ/sq·cm. Polypropylene, PET, CPET, and PETG films were used as substrates.

Shrink Sleeve Testing Protocol Included:

Tape Adhesion Test

A length of Scotch Tape 610, Light Duty Packaging, Transparent Film Tape, or equivalent, was placed along the width of the test print, so that it covered the ink to be tested. While holding the print down with one hand, the other hand slowly pulled the tape back on itself at about 180° angle. The sample was rated according to a 1-5 scale: 1 (Fail) was >50% ink removal: 2 (Fail) was 25-50% ink removal; 3 (Marginal Fail) was 10-24% ink removal; 4 (Marginal Pass) was 5-9% ink removal; and 5 (Pass) was <5% ink removal.

Fingernail Scratch Resistance

The test print was placed on a hard surface, ink side up. The surface was scratched in one continuous movement with back of a fingernail. The scratches were repeated if necessary, up to a total of 5. Noticeable marking or ink removal was given a rating of 1 (Fail); no noticeable marking and no ink removal was rated 5 (Pass).

Dry Crinkle Resistance (a.k.a. "Bicycle Test")

The test print was grasped firmly between the thumb and forefinger of each hand with about one inch of print between the two thumbs. The fingers were then rotated in an alternating motion for 10 cycles, then reversed and rotated for an additional 10 cycles. Noticeable cracks in ink or ink flaking off was given a rating of 1 (Fail); no noticeable cracks in ink and no ink flaking off is rated 5 (Pass).

Flexibility

The ability of the print to resist bending, twisting, etc., was evaluated by folding and creasing the print. Noticeable cracks in ink or ink flaking off is given a rating of 1 (Fail); no noticeable cracks in ink and no ink flaking off is rated 5 (Pass).

Blocking, 25 Ton, Specac Block Test

Ink to Ink test samples were prepared by folding a 4" wide and 8" long print test samples to form 4"×4" test samples in which half of the ink layer contacts the other half.

Ink to Film test samples were formed by placing 4"×4" inch sections of unprinted film over the printed side of 4"×4" inch a printed test samples.

The test samples were placed inside a sheet of 8½"×11" copy paper that was folded in half lengthwise so that the test sample was lined up with the bottom of the copy paper and the sample was taped in place.

A Specac Block Tester was prepared for the tests by removing heated platens, ensuring the temperature control unit and cooling water is off, installing the cap in the bottom of the lead screw and installing the bottom non-heated platen on the press.

The prints as prepared were placed on the bottom platen, another non-heated platen was placed over the prints and the lead screw was tightened so that the top bolster contacted the top platen. The pressure release handle was closed and the desired pressure was applied by pumping hydraulic press handle. The samples were left under pressure for 16 hours and then removed and evaluated. Noticeable ink pull off or transfer, sticking or cling was rated 1 (Fail); No noticeable ink pull off or transfer, sticking or cling was rated 5 (Pass).

Bottle Blocking

A printed sample, long and wide enough to fully wrap around a test jar or bottle with about ¾"-1" overhang on the top and bottom, was wrapped around, in this case, a jar, with the printed side towards the jar, and taped in place. A hot air gun was used to apply heat to the film, working the gun around the top of the jar first then moving to the sides and bottom. Heating was continued until the film has tightly shrunk around the jar, the jar was then allowed to cool, and then the print was removed and checked for any ink transfer to the jar. No ink transfer should occur.

Rub Resistance:

A printed test sample was secured onto the base of a Sutherland 2000 Rub Tester. A printed or unprinted section of a similar polymer film was evenly and firmly secured to a 4 pound testing weight. The weight was then attached to the rub tester so that the printed test sample was in contact with the polymer film attached to the 4 pound weight. The test was run for 500 cycles at 85 cycles per minute (setting 3). Severe scuffing of the printed test sample is rated 1 (Fail); minimal scuffing of the printed test sample is rated 3 (Pass); no scuffing or extremely minimal scuffing is rated 5 (Pass).

COF (Coefficient of Friction)

Static and Kinetic COF (coefficient of friction) for Ink/Ink and Ink/Metal surfaces were obtained according to ASTM Standard Test Method D 1894-95, using a TMI Slip and Friction Tester—Model #32-06 3.2, 200-gram rubber faced weight; Printed Sample Procedure.

Shrinkability

Shrinkability of a film was determined by taping a pre-measured printed test film to jar resting on a flat surface. Heat was then applied to the jar/film using a heat gun moved evenly around the jar until film is shrunk completely. The degree of shrink is determined by comparing the length of the pre-shrunk film to the shrunken film and is reported as a percentage of the amount of length lose relative to the original length. Adhesion and scratch were also evaluated on the shrunken film.

Color removal from the Printed materials was evaluated using the APR (Association of Plastics Recyclers) Test Method for Shrink Sleeve Labels on PET containers, which is described in detail below.

Examples 1-10, Printed Film Test Samples

The following commercially available UV and LED curable flexographic inks from Sun Chemical are used to exemplify the inventive method of the present application. The inks listed below are based on polyester acrylate and tri-acrylate monomers and have a 100% solids content. This list identifies the materials used to illustrate the invention and does not limit the invention to these inks.

CRCL UV Curable Flexographic Inks (Sun Chemical)

- Example 1: CRCL 91746609 R4248-41-1:UVF L/D OPQ WHITE
- Example 2: CRCL 91708143 R4248-41-2:UVF LED SIF WHITE
- Example 3: CRCL 91746608 R4248-97-4:UVF PRO BLACK
- Example 4: CRCL 91746661 R4248-97-1:UVF PRO CYAN
- Example 5: CRCL 91746670 R4248-97-2:UVF PRO MAGENTA
- Example 6: CRCL 91746671 R4248-97-3:UVF PRO YELLOW CRCL UV-LED Curable Flexographic Inks (Sun Chemical)

- Example 7: CRCL LED PRO BLACK
- Example 8: CRCL LED PRO CYAN
- Example 9: CRCL LED PRO MAGENTA
- Example 10: CRCL LED PRO YELLOW The inks were printed by the flexographic printing performed on a Mark Andy P7 UV Flexo Printing Press using Mercury UV Lamps typically run at a rate where the dose at 100 meters/minute was 125 mJ/sq. Three different plastic films commonly used for shrink sleeve labels on PET containers include, i.e., PP, PET, and PETG films, representing at least one saturated polymer and at least one unsaturated polymer. The objective was to evaluate the prints under APR (Association of Plastics Recyclers) de-inking protocol for Shrink Sleeve Labels on PET containers.

In one set of Examples, the inks of Examples 3 through 6 were arranged, applied, and printed on press in three different job configurations, i.e., three crystallizable PET (CPET) film substrates from three different suppliers, to provide individual side-by-side demonstrations of the inks on 3 different crystallized-PET films. Prints were subsequently overprinted with Example 2 White, as is common in reverse print applications.

Prints Evaluated on 3 Different Crystallizable PET Films:

CPET 1 Substrate=45-micron SKC EL 62 (SKC, Inc.)

CPET 2 Substrate=45-micron SKC-XEL60 (SKC, Inc.)

CPET 3 Substrate=50-micron FENC-SHFTF

The films were tested according to the Shrink Sleeve Testing Protocol described above. The results are shown in tables 1 and 2.

TABLE 1

| Performance properties based on prints produced using the protocol above | | | |
|---|---|---|---|
| Test ID | CPET 1 | CPET 2 | CPET 3 |
| Adhesion 610 | 5 PASS | 5 PASS | 5 PASS |
| Scratch | 5 PASS | 5 PASS | 5 PASS |
| Crinkle | 5 PASS | 5 PASS | 5 PASS |
| Flexibility | 5 PASS | 5 PASS | 5 PASS |
| SPECAC Blocking | 5 PASS | 5 PASS | 5 PASS |
| Bottle Blocking | 5 PASS | 5 PASS | 5 PASS |
| Rub Resistance (500 cycles, 85 cycles/min) | 3 (PASS) | 5 PASS | 5 PASS |
| COF Ink/Ink (static / kinetic) | 0.159 / 0.149 | 0.332 / .297 | 0.214 / 0.202 |
| COF Ink/metal (static / kinetic) | 0.154 / 0.117 | 0.147 / .147 | 0.133 / 0.133 |

TABLE 2

| Shrink Sleeve Properties at Maximum Shrink with Heat Gun | | | | | |
|---|---|---|---|---|---|
| Heat Gun Max Shrink | Start Length | End Length | % Shrink | Tape Adhesion | Scratch |
| CPET 1 | 23.1 cm | 6.4 cm | 72.30% | 4 Pass Slight Pick Off | 5 Pass |
| CPET 2 | 23.1 cm | 5.9 cm | 74.50% | 4 Pass Slight Pick Off | 5 Pass |
| CPET 3 | 23.1 cm | 6.0 cm | 74.00% | 4 Pass Slight Pick Off | 5 Pass |

For a Shrink Sleeve Film, the % shrink that a film is capable of is specific to the film. Typically, 70% to 75% is most common. The ink would preferably be formulated to be able to functionally perform (good adhesion and scratch resistance) and shrink to whatever level the film is shrunk, and not be a limiting factor to the application or process. The preferred range for % Shrink is ≥70%.

The composition of the samples and the results of the APR color removal tests conducted in the laboratory for the prints of UV flexo inks on the three different C-PET films are detailed below.

Test Methods:

APR Test Method for Shrink Sleeve Labels on PET Containers:

A caustic wash solution of 1% NaOH and 0.3% Triton X-100 in 200 ml of distilled water was prepared and heated to 85° C.

One and a half grams of printed label were cut into pieces of approximately 1 $cm^2$. The printed label pieces and 50 g of clear PET flake were added to the caustic wash solution and stirred at 1000 rpm for 15 minutes. The flake was then collected by straining through a typical kitchen mesh strainer, and a sample of wash water was collected. The collected flake was rinsed with 200 ml of tap water and a sample of rinse water was collected. The wash and rinse solutions were filtered with Whatman #1 Filter Paper and the filtered flakes were allowed to dry.

Once the flakes are dry, L* a* b* color values were measured using an X-rite spectrophotometer. Measurements were taken as an average reading of 10 flakes. Flatter flakes were preferably chosen for better spectrophotometer readability.

A control was prepared in the same manner, except without the label pieces, producing PET flakes and wash water that are devoid of any discoloration from ink. The wash water was filtered with Whatman #1 Filter Paper, the filtered flakes were allowed to dry and color values of the flakes were measures as above.

Target values for color change of the PET flakes vs. the control as established by the APR (Association of Plastics Recyclers) are as follows:

$$\Delta L: \leq 5.0$$

$$\Delta a: \leq 1.5$$

$$\Delta b: \leq 1.5.$$

For some applications, a wider range of ΔL, Δa, and Δb values for color change may be acceptable, for example:

$$\Delta L: \leq 7.5 \text{ or } 10.0$$

$$\Delta a: \leq 2.0 \text{ or } 2.5$$

$$\Delta b: \leq 2.0 \text{ or } 2.5$$

As shown in table 3 below, the results were very favorable with nearly 100% de-inking from the labels and the ink particulate filtered out, resulting in recycled PET (rPET) flake well within the L* a* b* values as shown in Table 3. In addition to the L* a* b* values as shown in Table 3, the wash solutions were visually inspected after use and found to be water-white clear and devoid of any visual discoloration. This further demonstrates the clean de-inking and complete removability of the UV curable ink and its suitability for use in the recycling process of the present invention without the need for a primer in the printing process at any stage.

The color values that were obtained from the tests run above were:

TABLE 3

| L* a* b* color values of washed flakes | | | |
|---|---|---|---|
| Flake Stain | L*a*b* | Average | Δ vs Control |
| Control[1] | L | 85.93 | — |
| | a | 0.12 | — |
| | b | 4.53 | — |

TABLE 3-continued

L* a* b* color values of washed flakes

| Flake Stain | L*a*b* | Average | Δ vs Control |
|---|---|---|---|
| CPET 1 | L | 86.17 | 0.24 |
| | a | 0.19 | 0.07 |
| | b | 4.27 | −0.26 |
| CPET 2 | L | 84.84 | −1.09 |
| | a | 0.08 | −0.04 |
| | b | 4.77 | 0.24 |
| CPET 3 | L | 85.89 | −0.04 |
| | a | 0 | −0.12 |
| | b | 4.32 | −0.21 |

[1]The control used to determine the L* a* b* values was unprinted plastic.

Crystallizable PET is a newly developed polymer that has been shown to be fully recyclable together with the PET flake from the bottles. In the present process, the inks printed on the crystallizable PET film were completely removed during the hot caustic (NaOH solution) wash cycle and the simultaneously recycled PET bottle and crystallizable PET label film to be of high quality (minimal tinting, good physical properties e.g. resistance properties).

Complete laboratory testing and evaluation of the prints indicates that all prints exhibited complete ink release under APR deinking method for Shrink Labels on PET containers. The ink came off in large particles and was filtered out by the Whatman #1 filter papers, leaving the wash and rinse solutions almost completely clear. All ink was removed, and the clean PET flake was not visually discolored.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method for recycling a plastic material, comprising the steps of:

a) providing a plastic article comprising said plastic material, wherein the plastic article has a printed surface upon which a UV cured ink has been directly printed without use of an intervening layer, wherein the printed surface is:
   i) the plastic article; or
   ii) a label attached to the plastic article; and wherein the UV cured ink comprises one or more colorants that are resistant to dissolving in a hot caustic solution which is a hot caustic wash; and wherein the UV cured ink is removed in the form of solid particles that are not dissolvable in the hot caustic wash;

b) immersing the plastic article in a hot caustic wash for equal to or less than 15 minutes, at a temperature from 70° C. to 95° C.; wherein the hot caustic wash is an aqueous solution comprising 1 wt % to 3 wt % NaOH and/or a non-ionic surfactant;

c) wherein the hot caustic wash removes the inks from the printed surface of the plastic article in the form of solid particles that are essentially insoluble in the hot caustic wash and precipitate out of the hot caustic wash, wherein the solid particles are filtered out of the hot caustic wash to provide a non-colored plastic article, wherein non-colored means that the UV curable ink is no longer adhered to the printed surface of the plastic article;

d) separating the non-colored plastic article from the ink precipitate and the hot caustic wash;

e) measuring the lightness value L*, the red/green axis a*, and the blue/yellow axis b* of both the non-colored plastic article obtained in steps b) to d) and the non-printed (control) plastic article using an X-rite spectrophotometer; wherein the non-colored plastic article obtained in steps b) through d) is a first substrate (s1) having a lightness value of (L*s1), a red/green value (L*s1), and a blue/yellow value (b*s1); and the non-printed (control) plastic article is a second substrate (s2) having a lightness value of (L*s2), a red/green value (a*s2), and a blue/yellow value (b*2);

f) calculating the ΔL, Δa, and Δb values, wherein ΔL, Δa, and Δb values represent the difference in color between the non-colored plastic article obtained in steps b) to d) vs a non-printed (control) plastic article made of the same plastic material as the plastic article of step a), but not having a surface that has been printed with a UV ink according to the following:

(i) ΔL is calculated using the following formula:

$\Delta L=(L^*s1)-(L^*s2)$;

(ii) Δa is calculated using the formula:

$\Delta a=(a^*s1)-(a^*s2)$; and (iii) Δb is calculated using the formula:

$\Delta b=(b^*s1)-(b^*s2)$;

and wherein:

the plastic material of the non-colored plastic article obtained in steps b) through d) is not stained or contaminated by the UV cured ink during recycling, and:

$$\Delta L: \leq 7.5$$

$$\Delta a: \leq 2.0$$

$$\Delta b: \leq 2.0.$$

2. The method of claim 1, wherein the ΔL, Δa, and Δb values obtained in step f) are:

$$\Delta L: \leq 5.0$$

$$\Delta a: \leq 1.5$$

$$\Delta b: \leq 1.5.$$

3. The method of claim 1, wherein the printed surface of the plastic article of step a) is a label attached to the article.

4. The method of claim 1 wherein the UV cured ink is a flexographic ink.

5. The method of claim 1 wherein the article comprising the plastic material being recycled comprises PET.

6. The method of claim 1 wherein the label comprises crystallizable PET.

7. The method of claim 1 wherein the plastic article and label are ground into flakes before removing the ink in step b).

8. The method of claim 1 wherein the non-colored plastic article and label are ground into flakes after separating the non-colored plastic article and label from the ink precipitate and hot caustic wash in step c).

9. The method of claim 1 wherein the plastic article is a bottle.

10. The method of claim 1 wherein the label is a shrink sleeve label.

11. The method of claim 1 wherein the UV cured ink comprises polyester acrylate and tri-acrylate monomers prior to being cured.

* * * * *